July 6, 1965
L. T. BARNES
3,193,742
TRIMMER CAPACITOR
Filed Jan. 17, 1963
2 Sheets-Sheet 1
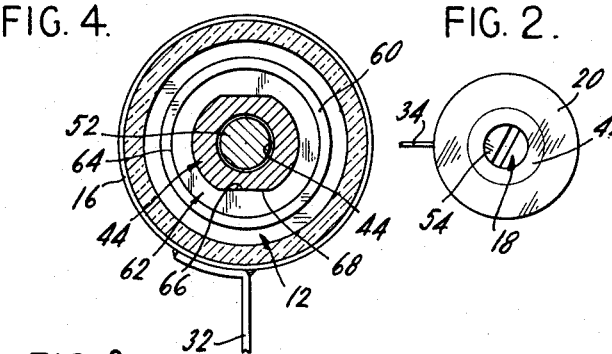
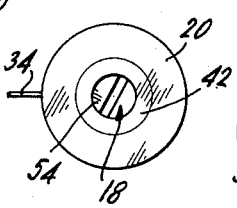
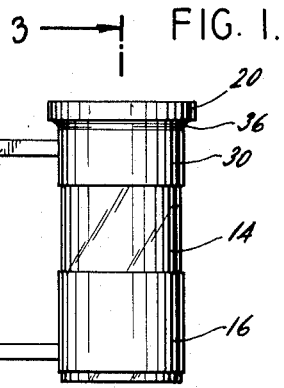
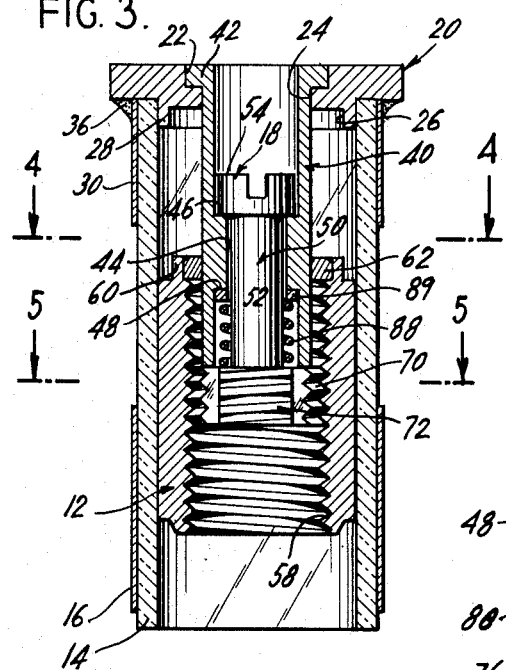
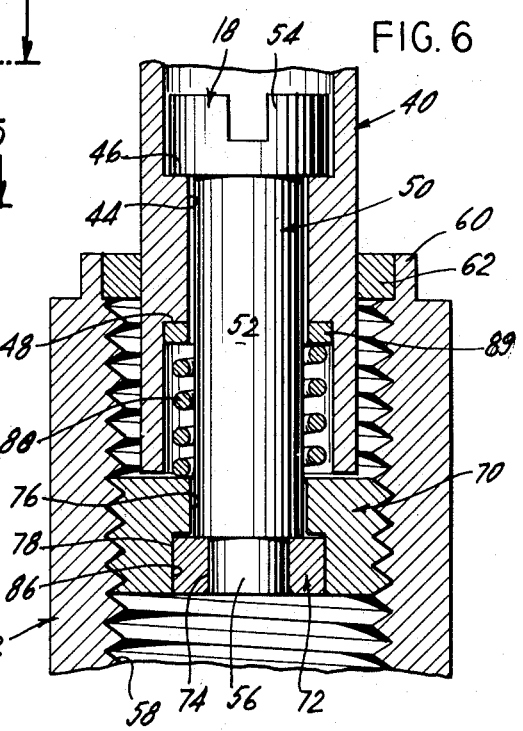
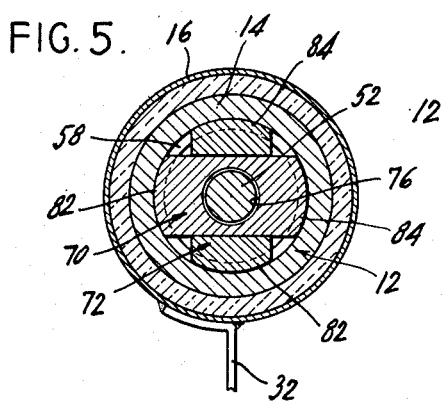
INVENTOR.
LLEWELLYN T. BARNES
BY Amster & Levy
ATTORNEYS July 6, 1965
L. T. BARNES
3,193,742
TRIMMER CAPACITOR
Filed Jan. 17, 1963
2 Sheets-Sheet 2
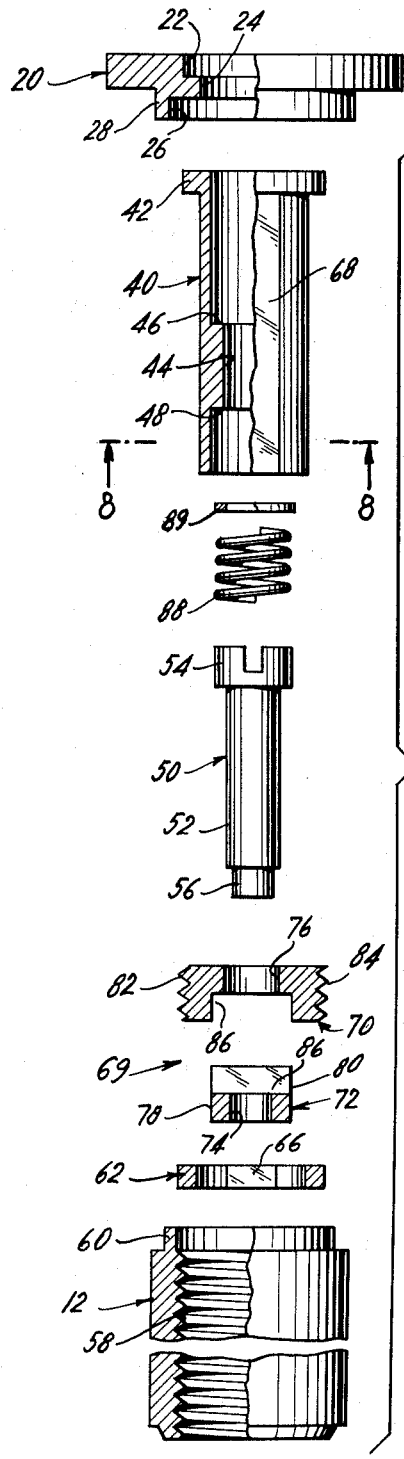
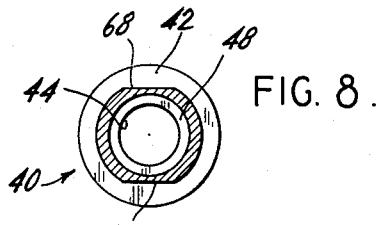
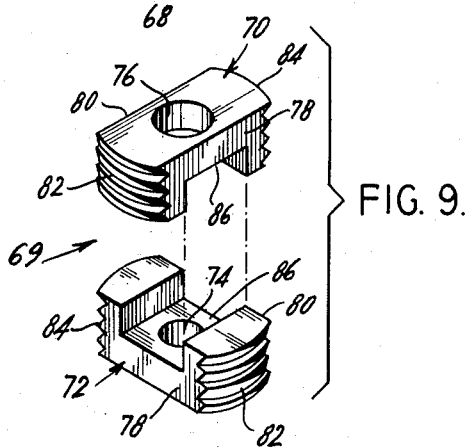
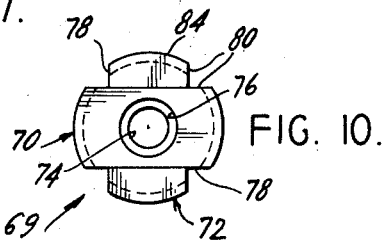
INVENTOR.
LLEWELLYN T. BARNES
BY Amster & Levy
ATTORNEYS

United States Patent Office 3,193,742
Patented July 6, 1965

3,193,742
TRIMMER CAPACITOR
Llewellyn T. Barnes, Freeport, N.Y., assignor of one-third to Charles T. Barnes, Freeport, and one-third to John F. Woog, Garden City, N.Y.
Filed Jan. 17, 1963, Ser. No. 252,076
8 Claims. (Cl. 317—249)

The present invention relates generally to improvements in the variable electrical capacitors, and in particular to capacitors of the trimmer type used to produce precise variations in capacity.

Trimmer capacitors of the type exemplified by United States Patent No. 2,607,826 issued to me on August 19, 1952, include a cylindrical body made of dielectric material. A band of conductive material is sprayed or otherwise coated on the outside of this cylinder adjacent one end thereof and serves as the fixed electrode of the capacitor. The movable electrode comprises a piston and a screw of conductive material formed integrally thereon; the screw is threaded throughout its length and is received by a thread bushing at one end of the cylinder. Thus, rotation of the screw will result in rotation and axial movement of the piston relative to the fixed band, thereby changing the capacity of the unit. An antibacklash mounting means is provided, which includes a nut in threaded engagement with the screw, means to prevent the nut from turning as the screw rotates, and a spring exerting pressure on the nut to bias the nut into firm engagement with the screw at all times.

While this type of piston trimmer capacitor operates effectively under ordinary conditions, its structure presents various problems in field operation. One difficulty becomes evident when it is critical to maintain precise values of capacitance. Under these conditions, it has been found that due to the large size of the adjusting shanks of the capacitors, the thermal expansion thereof causes random changes in the value of capacitance. By providing a shorter adjusting shank it is possible to minimize this thermal expansion, thereby maintaining constant capacitance at any given setting of the trimmer capacitor. In addition, the adjusting shank moved longitudinally during adjustment and protruded from the body of the capacitor, being thus exposed to accidental engagement which could affect the capacitance setting. Further, the piston electrode rotated during adjustment, thereby having an adverse effect upon precise and uniform capacitance adjustment.

It is an object of the present invention to provide an improved trimmer capacitor in which the adjusting shank, while rotatable, is not axially movable, and in which the piston electrode, while axially movable is restrained against rotation relative to the fixed electrode.

Another object of the present invention is the provision of a trimmer capacitor of the character described in which the adjusting screw is entirely sunken within the body of the capacitor so that no part thereof protrudes beyond the confines of the capacitor body so as to be accessible to possible damage or accidental turning.

A further object of the present invention is the provision of a trimmer capacitor of the type described, of relatively simplified construction which is effective in preventing rotation of the piston and eliminating backlash.

A further object of the present invention is the provision of a trimmer capacitor having a novel and improved duplex nut arrangement for screw adjustment of the piston electrode, said duplex nut arrangement providing a frictional binding force upon the meshed threading between the piston electrode and the adjusting means therefor.

In accordance with an illustrative embodiment demonstrating objects and features of the present invention, there is provided a trimmer capacitor which includes a hollow cylinder made of a material having a high dielectric constant, a fixed electrode mounted on the cylinder, and an internally-threaded piston electrode in longitudinal sliding engagement with the cylinder. Mounted on the cylinder is a guide bushing in sliding engagement with a washer which is fixed to the piston electrode for preventing rotation of the piston electrode. An adjusting member operatively carries an externally-threaded duplex nut arrangement which threadedly engages the piston electrode in such a manner that the piston electrode is moved axially upon rotation of said adjusting member. The duplex nut arrangement includes a major nut section and a minor nut section, and means for biasing the major nut section toward the minor nut section to transmit frictional binding force between the nut sections and the threading of the piston electrode.

The above brief description as well as further objects, features and advantages of the present invention will be more fully appreciated by reference to the following detailed description of presently preferred, but nonetheless an illustrative embodiment, in accordance with the present invention, when taken in conjunction with the accompanying drawings wherein:

FIG. 1 is an elevational view of a trimmer capacitor embodying features of the present invention;

FIG. 2 is a top plan view thereof;

FIG. 3 is a longitudinal section, on an enlarged scale, taken along the line 3—3 of FIG. 1;

FIG. 4 is a transverse section taken along the line 4—4 of FIG. 3;

FIG. 5 is a transverse section taken along the line 5—5 of FIG. 3;

FIG. 6 is an enlarged sectional view of a portion of the adjusting member and movable electrode, in the manner in which they are illustrated in FIG. 3;

FIG. 7 is an exploded view of the capacitor components, with the capacitor cylinder and terminals being removed and with portions broken away and shown in section to reveal inner constructional details;

FIG. 8 is a transverse section taken along the line 8—8 of FIG. 7;

FIG. 9 is an exploded perspective view of the duplex nut arrangement incorporated in the trimmer capacitor;

FIG. 10 is a plan view of the duplex nut arrangement, showing the nut sections in engagement and the minor nut section mounted to the adjusting member; and FIG. 11 is a plan view of the guide washer incorporated in the trimmer capacitor.

Referring specifically to the drawings, there is shown a trimmer capacitor of the type in which a piston electrode 12 is slidable within a dielectric cylinder 14, the latter having affixed thereto a metal band 16 serving as the fixed electrode. The piston electrode 12 is adjusted within cylinder 14 by manually-operated screw means designated generally by reference numeral 18.

The capacitor parts are mounted on a base section 20 which is made of an electrically-conductive material, for example a suitable metal such as "Invar" which has a low coefficient of expansion.

The base section 20 has an outer circular recess 22 which communicates with a circular bore 24 of smaller diameter, the bore 24 in turn communicating with an enlarged inner circular recess 26. The recess 26 is defined by an annular flange 28 projecting inwardly from the inner surface of the base section 20.

The hollow cylinder 14 is preferably made of precision bore glass tubing or other material having a high dielectric constant, and is concentrically joined to base 20. The conductor band 16, made of conductive material, such as flat strips of silver, is secured to the outer surface of cylinder 14 at one end thereof. The band 16 may be in the nature of a fired-on coating. Similarly a conductor band 30 is affixed to the other end of cylinder 14. Terminals 32 and 34 are attached to the respective bands 16 and 30, as shown in FIG. 1, and it is preferable to make terminals 16 and 30 of strip material in place of wire terminals, in order to reduce the inductance produced by such wire terminals when used with flat bands of very thin conductive material, such as silver or the like. The cylinder 14 is coaxially secured to the base section 20, with the end portion of said cylinder fitted onto the annular flange 28, as shown in FIG. 1. The connection is also secured by soldering the base member 20 to the conductor band 30 carried by the cylinder 14, as shown at 36 in FIG. 3.

A tubular guide bushing 40, made of a conductive metal, is also mounted on the base section 20. The guide bushing 40 is generally cylindrical and has a peripheral flange 42 at its upper end. The bushing 40 is press-fitted through the base section bore 24 with the flange 42 seated within the outer circular recess 22. In this mounted position, the guide bushing 40 extends longitudinally and centrally through the hollow cylinder 14, and communicates with the interior thereof. Instead of being press-fitted in the base section 20, the guide bushing 40 may be formed integrally with said base section.

The guide bushing 40 serves as a mount for the adjustable screw means 18. For this purpose, the interior surface of guide bushing 40 is formed with an intermediate central bore portion 44 of reduced diameter forming opposed shoulders 46 and 48 at its opposite ends.

The capacitor adjusting member, indicated generally by reference numeral 50, comprises a cylindrical shank 52 having an enlarged slotted head portion 54 and a bottom terminal portion 56 of reduced diameter. The shank 52 is rotatably mounted within the central bore portion 44 of guide bushing 40, with the head 54 resting upon shoulder 46. As clearly shown in FIG. 3, the head 54 is located well within the interior of guide bushing 40 so as to be protected against accidental turning. In the mounted position of adjusting member 50, the bottom terminal portion 56 is located below the guide bushing 40.

The piston electrode 12 is of cylindrical shape and is sized to fit slidably within the interior of cylinder 14. Said piston electrode 12 has a central threaded bore 58 of appreciably larger diameter than the outer diameter of guide bushing 40 so that the guide bushing may extend freely through said bore 58 and the piston electrode in its movement may telescope with the guide bushing 40. The piston electrode 12 has at its outer end a projecting annular flange 60 which forms a mounting seat for a washer 62 of non-conductive material which is carried by the upper or outer end of the piston electrode 12. The guide washer 62 is of annular shape, having a substantially circular outer surface 64 and a circular inner surface formed with opposed flats 66, as shown in FIG. 11. The outer cylindrical portion of guide bushing 40 is also formed with corresponding flat sections 68 (as best seen in FIG. 8), so that the washer 62 can be placed in sliding engagement with the outer portion of guide bushing 40, but with the corresponding flat portions preventing rotation of the washer 62 (and the piston electrode 12 affixed thereto) relative to the guide bushing 40 and base 20.

The screw means 18 also includes a duplex nut arrangement 69 which is used to drive the piston electrode 12 and which includes a major nut section 70 and a minor nut section 72. These nut sections are substantial duplicates of one another, with the exception that the bore 74 of the minor nut section 72 is smaller than the bore 76 of the major nut section 70. Each of the nut sections 70 and 72 is partly cylindrical comprising a rectangular body having two substantially parallel flat longitudinal surfaces 78, 80, and two substantially parallel arcuate end surfaces 82, 84. As shown in FIG. 9, each of the nut sections 70 and 72 is provided with a U-shaped aperture 86. These apertures 86 are sized to receive the central portion of the opposite nut section when the nut sections are arranged perpendicular to each other so that the major nut section 70 interfits with the minor nut section 72. When the duplex nut arrangement 69 is assembled as shown in FIG. 10, an interrupted threaded outer configuration of circular shape is obtained.

The duplex nut arrangement 69 is assembled to the terminal portion 56 of adjusting member 50. The major nut section 70 is carried freely by the cylindrical shank 52 and floats thereon, while the minor nut section 72 is rigidly secured to the terminal portion 56. It is preferable to have the diameter of terminal portion 56 slightly larger than bore 74 of the minor nut section 72, in order that the minor nut section may be attached to the adjusting shank 52 by a press fit, although these parts may also be joined by other means, such as soldering, brazing or welding.

As seen in FIG. 6, a compression spring 88 is seated at one end on a washer 89 abutting the shoulder 48 of guide bushing 40 and at its other end on the upper surface of the major nut section 70. Spring 88 thus biases the major nut section 70 toward the minor nut section 72. In its assembled condition, there is a slight spacing between said nut sections, as shown most clearly in FIG. 6. Accordingly, the biasing force exerted by spring 88 on the upper or major nut section 70 is transmitted through the screw threading to the piston electrode 12. In turn, the biasing force is transmitted by the piston electrode to the lower or minor nut section 72. The latter is, however, restrained from downward movement by its rigid attachment to the adjusting member 50. Hence, the effect of spring 88 is to provide an opposed spring tension between the nut sections 70 and 72, which results in a frictional binding force between the threaded portions 82, 84 of both nut sections and the internally-threaded bore 58 of the piston electrode 12. The tension provided by compression spring 88 allows fine adjusting movement of the piston electrode 12, and also maintains the latter in a precise adjusted position even when subjected to jarring or vibration, as well as eliminating back-lash and creepage, thereby providing the conditions necessary for the proper functioning of a trimmer capacitor. Because the biasing force of the spring 88 is in an axial direction, it will be apparent that the force is distributed uniformly around the periphery of a plurality of turns of the threaded bore 58 of piston electrode 12. Thus the frictional binding force between the threaded portions is maintained uniform, resulting in precise, consistent tracking throughout the operating range of the capacitor.

In use, the capacitance of the unit may be conveniently adjusted by inserting the blade of a screw driver or other suitable tool into the top open end of the guide bushing 40 and into engagement with the kerfed head 54 of adjusting member 50. Adjusting member 50 may thus be manually rotated, carrying with it the secured minor nut section 72 which in turn rotates the floating major nut section 70. Rotation of the duplex nut arrangement 69 is translated into longitudinal movement of piston electrode 12 along cylinder 14 and relative to the fixed electrode 16. By means of the opposed flats 66 on washer 62 which conform to the flat sections 68 of guide bushing 40, rotation of piston electrode 12 is prevented, and the piston electrode therefore slides longitudinally in relation to the guide bushing.

As previously pointed out, the conductor band 16 constitutes the fixed electrode of the trimmer capacitor and said band and piston electrode 12 are separated by cylinder 14 which has a high dielectric constant. By translating rotation of the adjusting member 50 into longitudinal sliding movement of the piston electrode 12, the capacitance of the unit is selectively varied. Accordingly, the movable electrode 12 receives its electrical charge through terminal 34, conductor band 30, base section 20, guide bushing 40, adjusting member 50, and the duplex nut arrangement 69.

In FIG. 3, the trimmer capacitor is shown in an adjusted position in which the movable electrode is located to provide an intermediate value of capacitance. By rotating the adjusting member 50, the piston electrode 12 can be adjusted to its maximum capacitance position at the lower end of hollow cylinder 14 and in registry with the fixed electrode band 16, and to its minimum capacitance position which is at the upper end of cylinder 14, and out of registry with fixed electrode band 16.

In the position of minimum capacitance, the annular flange 60 of piston electrode 12, as well as the washer 62 seated therein, enter the circular recess 26 of the base section 20. The parts are so sized that the flange 60 and washer 62 will engage the upper surface of recess 26 and be stopped thereby before the threading of the nut sections 70 and 72 becomes disengaged from the threaded bore 58 of piston electrode 12.

In the position of maximum capacitance, the washer 62 engages the upper surface of major nut section 70, thereby preventing the piston electrode 12 from moving out of threaded engagement with said nut section 70.

Thus, from above description, it can be seen that the trimmer capacitor disclosed herein lends itself to compactness of size. In particular the adjusting member 50 can be greatly shortened in length, thereby reducing thermal expansion thereof which would result in random variations in capacitance.

While a preferred embodiment of the invention has been shown and described herein, it is obvious that numerous additions, changes and omissions may be made without departing from the spirit and scope of the invention.

What I claim is:

1. A trimmer capacitor comprising a hollow cylinder formed of a material having a high dielectric constant and carrying a fixed electrode on the outer surface thereof, a hollow, internally-threaded piston electrode in longitudinal sliding engagement with the interior of said cylinder, means for guiding said piston electrode and preventing rotation thereof, and adjusting means for moving said piston electrode longitudinally within said cylinder and relative to said fixed electrode, said adjusting means including a manually-rotatable shank extending into said cylinder and longitudinally immovable therein, a duplex nut arrangement disposed within the piston electrode and comprising a major nut section and a separate minor nut section, said minor nut section being secured to said shank within said piston electrode for rotation with said shank, said major nut section being loosely mounted on said shank for movement longitudinally of said shank and being in spaced overlying relationship with said minor nut section, means for effecting intercoupling of said nut sections for simultaneous rotation thereof, each nut section having an external peripheral outer surface provided with threading engaging the internal threading of said piston electrode, both nut sections turning with said shank to adjust the piston electrode longitudinally within said cylinder, said nut sections being spaced from each other along the direction of the longitudinal axis of said piston electrode, and means for biasing said major nut section toward said minor nut section to transmit frictional binding force between the external threading of said nut sections and the internal threading of said piston electrode.

2. A trimmer capacitor comprising a hollow cylinder formed of a material having a high dielectric constant and carrying a fixed electrode on the outer surface thereof, a hollow, internally-threaded piston electrode disposed in and in longitudinal sliding engagement with the interior of said cylinder, a shank extending longitudinally and centrally within said piston electrode and being manually rotatable therein, a duplex nut assembly disposed within said piston electrode and comprising a major nut section and a minor nut section each constituting a segmental portion of a cylinder and provided with means effecting mutual interfitting thereof for simultaneous rotation, the outer cylindrical surfaces of said nut sections being threaded and in their interfitting relationship forming an interrupted threaded outer configuration of circular shape, said threaded outer configuration being in meshed engagement with the internal threading of said piston electrode, said minor nut section being immovably fixed to the inner end of said shank and the major nut section being slidable along the longitudinal axis of said shank, said major nut section overlying the minor nut section and being spaced therefrom along the direction of the longitudinal axis of said shank, and spring means between a fixed portion of said cylinder and the upper surface of the major nut section for biasing the major nut section toward the minor nut section along the longitudinal axis of said shank and providing frictional binding force between said nut sections and the internal threading of said piston electrode.

3. A trimmer capacitor comprising a hollow cylinder formed of a material having a high dielectric constant and carrying a fixed electrode on the outer surface thereof, a hollow, internally-threaded piston electrode disposed in and in longitudinal sliding engagement with the interior of said cylinder, a shank extending longitudinally and centrally within said piston electrode and being manually rotatable therein, a duplex nut assembly comprising a major nut section and a minor nut section each being U-shaped and being assembled in inverted mating positions relative to each other for simultaneous rotation, the outer peripheral surfaces of said nut sections being threaded and in their interfitting relationship forming an interrupted threaded outer configuration of circular shape, said threaded outer configuration being in meshed engagement with the internal threading of said piston electrode for longitudinal movement of said piston electrode within said cylinder when said nut sections are rotated, said minor nut section being immovably fixed to the inner end of said shank and the major nut section being loosely mounted on said shank and slidable along the axis thereof, said major nut section overlying the minor nut section and being spaced therefrom along a direction of the longitudinal axis of said shank, and spring means between a fixed portion of said cylinder and the upper surface of the major nut section for biasing the major nut section toward the minor nut section along the longitudinal axis of said shank and providing frictional binding force between said nut sections and the internal threading of said piston electrode.

4. A trimmer capacitor comprising a hollow cylinder formed of a material having a high dielectric constant and carrying a fixed electrode on the outer surface thereof, a hollow, internally-threaded piston electrode disposed in and in longitudinal sliding engagement with the interior of said cylinder, a tubular guide bushing mounted at one end of said cylinder and extending centrally within said cylinder, an adjusting shank rotatably mounted within said guide bushing and projecting therefrom into said piston electrode, said shank being longitudinally immovable within said cylinder, a duplex nut assembly disposed within said piston electrode and comprising a major nut section and a minor nut section each constituting a segmental portion of a cylinder and provided with means for effecting mutual interfitting thereof for simultaneous rotation, the outer cylindrical surfaces of said nut sections being threaded and in their interfitting relationship forming an interrupted threaded outer configuration of circular shape, said threaded outer configuration being in meshed engagement with the internal threading of said piston electrode, said minor nut section being immovably fixed to the inner end of said shank and the major nut section being slidable along the axis of said shank, said major nut section overlying the minor nut section and being spaced therefrom along a direction of the longitudinal axis of said piston electrode, spring means between a fixed portion of said tubular guide bushing and the upper surface of said major nut section for biasing the major nut section toward the minor nut section along the axis of said shank and providing frictional binding force between said nut sections and the internal threading of said piston electrode, and means restraining rotational movement of said piston electrode whereby rotation of said shank and nut sections moves said piston electrode longitudinally within said cylinder with the piston electrode telescoping over said tubular guide bushing.

5. A trimmer capacitor according to claim 4 in which each nut section comprises rectangular body having opposed arcuate threaded outer surfaces and a central rectangular slot thereon, said nut sections being disposed in a mutually-inverted position with the rectangular slots interfitting.

6. A trimmer capacitor according to claim 4 in which said shank has a slotted head, said shaft and head being entirely located within the interior of said tubular guide bushing.

7. A trimmer capacitor according to claim 4 in which said biasing means comprises a compression spring mounted on said shank, said spring being seated at one end on a fixed portion of said guide bushing and at the other end on said major nut section.

8. A trimmer capacitor comprising a hollow cylinder formed of a material having a high dielectric constant and carrying a fixed electrode on the outer surface thereof, a hollow, internally-threaded piston electrode disposed in and in longitudinal sliding engagement with the interior of said cylinder, a tubular guide bushing mounted at one end of said cylinder and extending centrally within said cylinder, an adjusting shank rotatably mounted within said guide bushing and projecting therefrom into said piston electrode, said shank being longitudinally immovable within said cylinder, a duplex nut assembly disposed within said piston electrode and comprising a major nut section and a minor nut section each constituting a segmental portion of a cylinder and provided with means for effecting mutual interfitting thereof for simultaneous rotation, the outer cylindrical surfaces of said nut sections being threaded and in their interfitting relationship forming an interrupted threaded outer configuration of circular shape, said threaded outer configuration being in meshed engagement with the internal threading of said piston electrode, said minor nut section being immovably fixed to the inner end of said shank and the major nut section being slidable along the axis of said shank, said major nut section overlying the minor nut section and being spaced therefrom along a direction of the longitudinal axis of said piston electrode, spring means between a fixed portion of said tubular guide bushing and the upper surface of said major nut section for biasing the major nut section toward the minor nut section along the axis of said shank and providing frictional binding force between said nut sections and the internal threading of said piston electrode, and means restraining rotational movement of said piston electrode whereby rotation of said shank and nut sections moves said piston electrode longitudinally within said cylinder with the piston electrode telescoping over said tubular guide bushing, said restraining means including a washer affixed to said piston electrode and having a non-circular aperture, said guide bushing having a non-circular configuration conforming to the shape of said aperture, and said guide bushing extending through said washer to restrain rotation of said piston electrode within said cylinder.

References Cited by the Examiner
UNITED STATES PATENTS

| | | | |
|---|---|---|---|
| 2,754,458 | 7/56 | Shull | 317—249 |
| 3,071,716 | 1/63 | Young | 317—248 |

JOHN F. BURNS, *Primary Examiner.*

JOHN P. WILDMAN, *Examiner.*